UNITED STATES PATENT OFFICE.

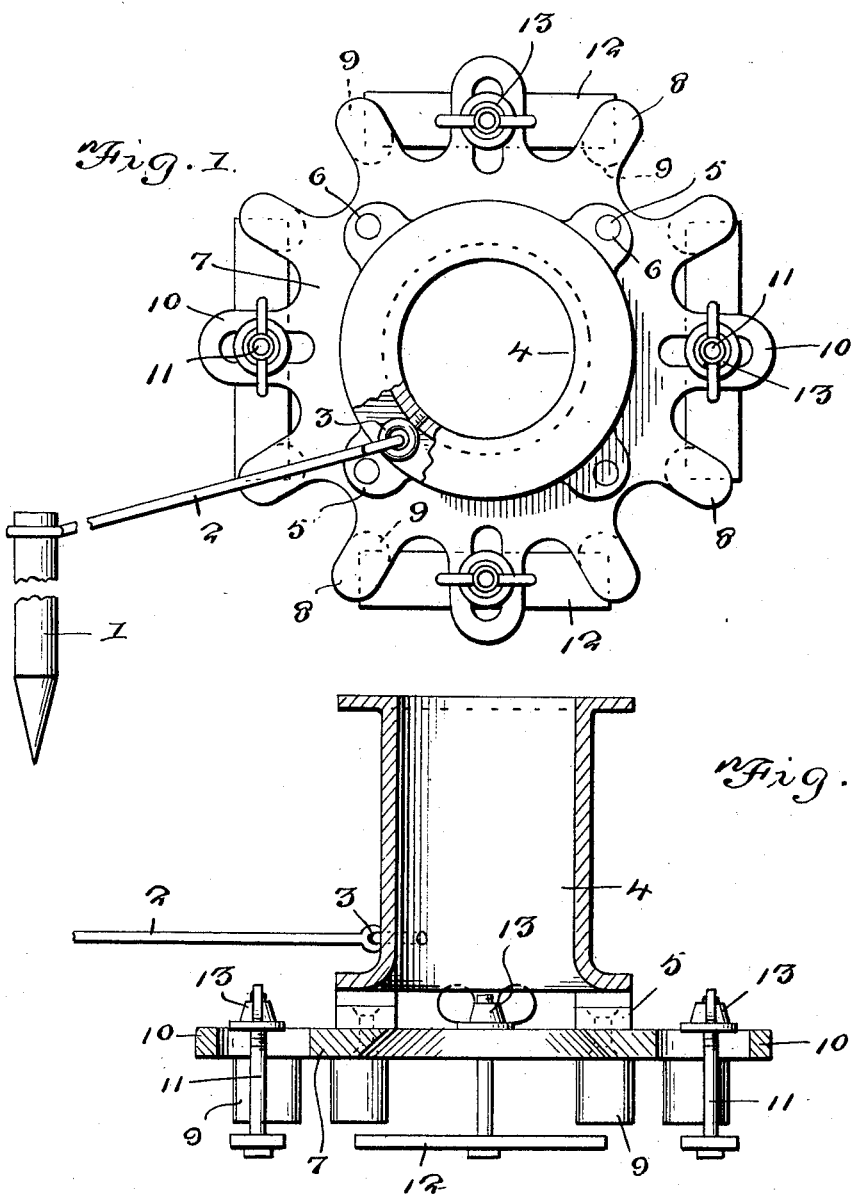

JESSE S. MARTIN, OF REIDSVILLE, NORTH CAROLINA.

AUTOMOBILE-WHEEL ATTACHMENT.

1,374,939.  Specification of Letters Patent.  Patented Apr. 19, 1921.

Application filed July 20, 1920. Serial No. 397,801.

*To all whom it may concern:*

Be it known that I, JESSE S. MARTIN, a citizen of the United States, residing at Reidsville, in the county of Rockingham and State of North Carolina, have invented new and useful Improvements in Automobile-Wheel Attachments, of which the following is a specification.

My present invention has for its object the provision of an attachment susceptible of ready application to an automobile wheel without the employment of skilled labor or tools, and calculated to be used to advantage in utilizing the power of the car to extricate the same from a quagmire or other bad place in or adjacent to a road.

To the attainment of the foregoing, the invention consists in the improvement as hereinafter described and definitely claimed.

In the accompanying drawings, hereby made a part hereof:—

Figure 1 is a side elevation of my novel attachment, with the cable intermediate of the drum and the anchor shown as broken.

Fig. 2 is a diametrical section of the same.

Similar numerals of reference designate corresponding parts in both views of the drawings.

Among other elements my improvement contemplates the employment of a stake or other anchor 1 and a cable 2, the latter being connected at 3 to a hollow drum 4 and being designed to be taken up on the drum incident to the rotation of an automobile wheel to which the drum is attached, in a manner well known in the art.

In accordance with my invention the drum 4 is provided at its inner end with peripheral ears 5 which are opposed to and connected by rivets 6 with the face of an annular carrying-body 7. The said body 7 is provided with pairs of radial projections 8 on which are lateral arms 9 adapted to rest at opposite sides of spokes of an automobile drive wheel, and the body 7 is also provided with radial longitudinally-slotted projections 10 for the passage of headed and threaded bolts 11. The said bolts 11 are equipped with clamping bars or plates 12 and wing-nuts 13.

In applying my novel attachment to one of the rear drive wheels of an automobile, the annular carrying-body 7 is arranged against the outer sides of the wheel spokes so that the arms 9 are positioned at opposite sides of spokes, and the said body 7 is strongly fastened to the wheel by the proper positioning of the bolts, wing-nuts and clamping plates, relatively to the body 7 and the wheel, and this without scratching or otherwise marring the wheel. The clamping plates 12 are, of course, arranged against the inner sides of the spokes. The anchor 1 is then affixed at a suitable point so that when the automobile wheel is rotated by the motor of the automobile the cable 2 will be taken up on the drive 4 and the automobile will by its own power be extricated.

Manifestly my novel attachment is adapted to be applied to and removed from a wheel with such facility that it is entirely feasible to carry the attachment in a tool box or other receptacle on the automobile. If desired, however, the attachment minus the cable and anchor may be carried on a wheel; the cable being connected to the drum when occasion arises for the use of the attachment.

Having described my invention, what I claim and desire to secure by Letters-Patent is:—

An automobile wheel attachment comprising a drum adapted for use in association with a cable and cable-anchoring means and having at its inner end peripheral ears, an annular carrying body opposed to the inner end of the drum and riveted to the ears thereof and having radial, longitudinally-slotted projections and also having pairs of other radial projections and lateral arms extending at right angles inwardly from the latter and adapted to rest at opposite sides of spokes, threaded bolts extending through the slots of the first-named projections, spoke-clamping plates carried by the said bolts and disposed in a plane inwardly beyond the inner ends of said arms, and nuts mounted on the bolts and opposed to the outer side of the carrying body.

In testimony whereof I affix my signature.

JESSE S. MARTIN.